United States Patent
Liu et al.

(10) Patent No.: US 8,869,590 B2
(45) Date of Patent: Oct. 28, 2014

(54) METHOD AND APPARATUS USED FOR DETERMINING FRICTION BETWEEN SLIDER AND ROTATING DATA STORAGE MEDIUM

(71) Applicant: Seagate Technology LLC, Cupertino, CA (US)

(72) Inventors: Huiwen Liu, Eden Prairie, MN (US); David Wobbe, Wabasha, MN (US); Xuan Zheng, Savage, MN (US); Timothy William Stoebe, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 72 days.

(21) Appl. No.: 13/675,798

(22) Filed: Nov. 13, 2012

(65) Prior Publication Data
US 2014/0133053 A1 May 15, 2014

(51) Int. Cl.
*G01N 19/02* (2006.01)
*G11B 20/18* (2006.01)

(52) U.S. Cl.
CPC .................................. *G11B 20/1816* (2013.01)
USPC .................................................. 73/9; 73/105

(58) Field of Classification Search
USPC ....................................................... 73/9, 105
See application file for complete search history.

(56) References Cited

U.S. PATENT DOCUMENTS

| | | | |
|---|---|---|---|
| 5,115,664 A | 5/1992 | Hegde et al. | |
| 5,539,592 A * | 7/1996 | Banks et al. | 360/75 |
| 5,859,357 A | 1/1999 | Kameyama et al. | |
| 5,859,358 A | 1/1999 | Wood et al. | |
| 6,225,799 B1 | 5/2001 | Gergel et al. | |
| 6,590,737 B2 | 7/2003 | Imamura | |
| 2006/0179927 A1* | 8/2006 | Mate et al. | 73/105 |

OTHER PUBLICATIONS

Sonnenfeld, "Capacitance Methods in Head-Disk Interface Studies", IEEE Transactions on Magnetics, vol. 29, No. 1, Jan. 1993, pp. 247-252.
Burger et al., "Miniaturised Friction Force Measuring System for Tribological Research on Magnetic Storage Devices", IEEE, 1996, pp. 99-104.

* cited by examiner

*Primary Examiner* — Peter Macchiarolo
*Assistant Examiner* — Anthony W Megna Fuentes
(74) *Attorney, Agent, or Firm* — Hollingsworth Davis, LLC

(57) ABSTRACT

A flexible member is coupled between an actuator arm and a slider. The flexible member facilitates relative motion in a tangential direction of a rotating medium. The relative motion is detected via a displacement sensor, and a friction between the slider and the rotating medium is determined based on the sensed relative motion.

15 Claims, 6 Drawing Sheets

METHOD AND APPARATUS USED FOR DETERMINING FRICTION BETWEEN SLIDER AND ROTATING DATA STORAGE MEDIUM

SUMMARY

The present disclosure is directed to methods and apparatuses used for determining friction between slider and rotating data storage medium. In one embodiment, a flexible member is coupled between an actuator arm and a slider. The flexible member facilitates relative motion in a tangential direction of a rotating medium. The relative motion is detected via a displacement sensor, and a friction between the slider and the rotating medium is determined based on the sensed relative motion.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
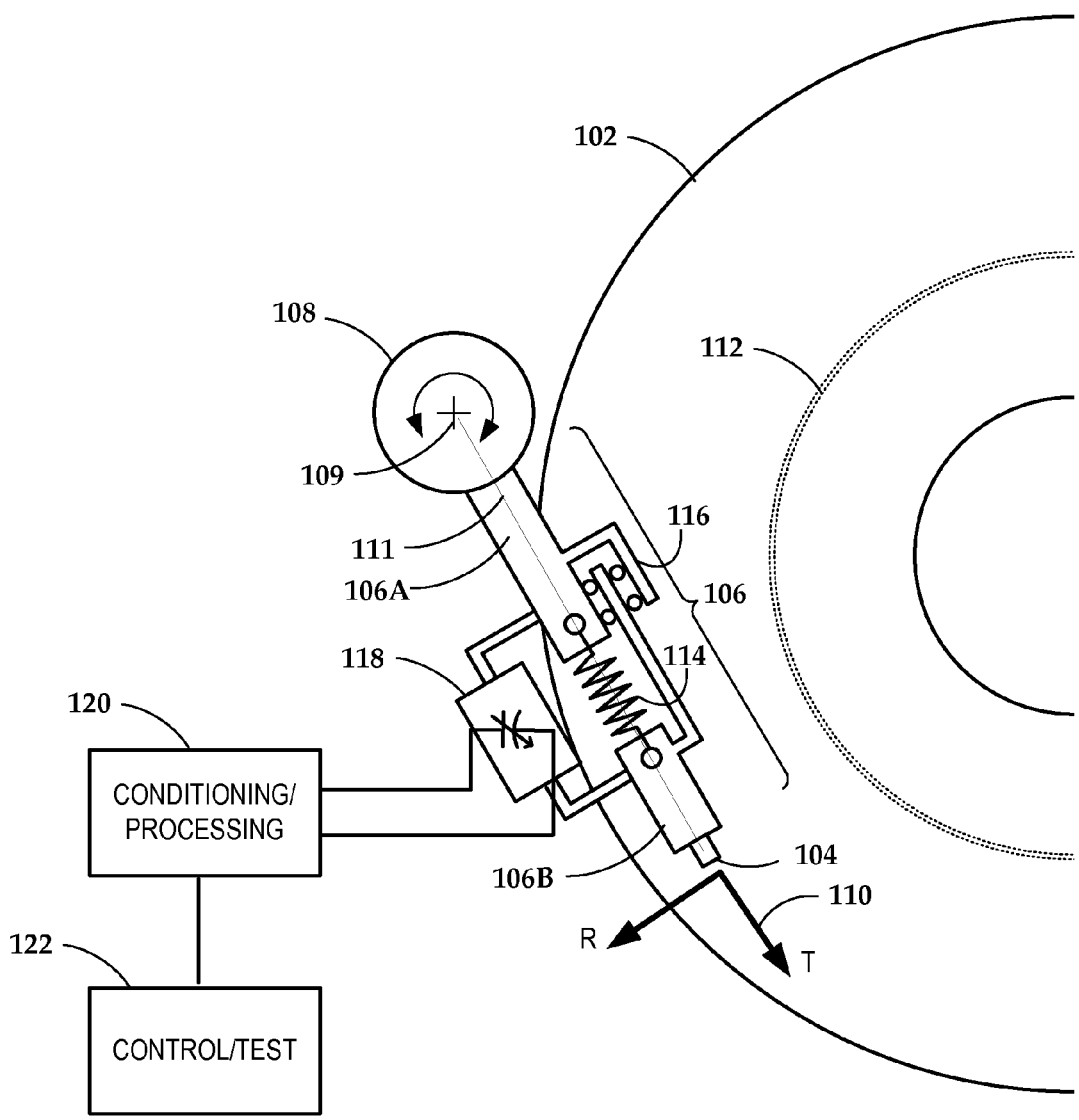
FIG. 1 is a simplified block diagram of a friction testing apparatus according to an example embodiment.

The present disclosure generally relates to magnetic data storage devices such as hard disk drives (HDDs). Hard drives include one or more magnetic disks that are rotated by a spindle motor. An arm-mounted read/write transducer, generally referred to as a "slider," is positioned just above a surface of the rotating disk. The slider can read the disk by detecting patterns of changing magnetic fields that encode digital bits. A write head of the slider can apply a magnetic field to set/change the value of the bits stored on the disk.

A media-facing surface of the slider (e.g., an air-bearing surface, or ABS) is formed so that the slider is prevented from touching the surface of the media by a thin layer of moving air generated by the spinning disk. This layer of air ensures the slider is held at a relatively constant fly-height above the media surface. The slider may include features to finely adjust the media-to-head distance for the read and write heads to adjust for variations in fly height and other conditions. For example, the slider may employ a heater that causes local deformation of a portion of the slide where the read and write heads are located. This local deformation allows adjustment of the media-to-head distance by varying power input to the heater.

Because of ever-increasing demand for storage capacity, the physical sizes of individual bits on the magnetic media have been decreasing in order to fit the more data onto the same size disks. This has lead to an associated decrease in read/write transducer dimensions, fly height, and media-to-head distance. The lowering of media-to-head distance leads to increasing possibility of slider-to-head contact. Contact between the slider and the portions of the media may lead to loss of data, and so it is useful to detect/measure contact during device development, testing, and/or use.

Reduction of fly-height and slider-to-media distance makes minimizing slider-to-media contact ever more challenging. Head-to-disk tribology is a key process input variable (KPIV) for reliability and failure analysis. Friction testing may be used for contact detection and understanding the tribological performance of head-to-disk interface. The friction between head and disk is currently measured on spin-stand testers which simulate head-disk contact during relative motion between the head and disk.

Spin-stand testers are highly specialized laboratory instruments that simulate some aspects of the hard drive environment. While useful during early product development, a spin-stand cannot necessarily recreate all conditions that occur in the tight packaging of a modern hard drive. For example, factors such as windage, temperature, relative humidity, modulation, clearance, electrical field, and magnetic fields may be different in a spin-stand tester than in a production drive enclosure. Even if some of these conditions could be simulated in isolation, it is difficult for a spin-stand tester to adequately recreate the product's operating environment in its totality.

As a result, this disclosure describes a friction testing device that can be placed in a production-type hard drive enclosure. The device includes a flexible member coupled between an actuator arm and a slider. The flexible member facilitates relative motion in a tangential direction of a rotating medium. A capacitive displacement sensor detects this relative motion and produces a signal useable for determining friction between the slider and the rotating medium. Other displacement sensors may be used with or instead of a capacitive sensor, including optical sensors, resistive sensors, strain gauge, piezoelectric (PZT) elements, etc. A friction tester enclosable in a hard drive case may significantly increase volume testing capability without incurring significant costs.

The proposed solution will enable friction measurement at drive level. The same principle and similar design (that using the concept proposed in this disclosure) can also be used for normal force or stiction measurement by adjusting the flexure cantilever configuration. The same principle and similar design can also be used for friction measurement in any machine that has a rotating disk. This design will enable friction-based contact detect in the absence of an appreciable off-track force component, e.g., it will enable zero-skew contact heat induced reader protrusion (CHIRP) measurement.

In reference now to FIG. 1, a simplified block diagram illustrates components of a friction measurement device according to an example embodiment. Generally, a rotatable data storage media 102 (e.g., magnetic disk) is read from and/or written to by a read/write transducer 104 (e.g., hard drive slider or head). The slider 104 is moved radially across the media 102 by an arm 106 that is rotated by an actuator 108. The slider 104 rides on a thin layer of pressured air that prevents contact with the media 102 during read and write operations.

An axis 110 provides a reference that indicates radial (R) and tangential (T) directions relative to the interface between the media 102 and the slider 104. The actuator 108 moves the slider 104 in a mostly radial direction across the media 102 by rotation about axis 109. The curved path caused by rotation of the actuator 108 may also induce some small tangential component of motion as the slider 104 is moved across the media 102. Generally, the rotation of the actuator 108 repositions the slider 104 to read different tracks (e.g., track 112) on the media 102, the tracks being generally arranged as concentric rings on the media surface.

Friction between the slider 104 and media 102 will manifest itself as a force on the slider 104 primarily in the tangential direction (e.g., along a line 111 between the rotational axis 109 and slider 104). The arm 106 includes features for measuring this force, while still retaining the ability for the arm 106 to fit and operate within a drive enclosure, e.g., a production enclosure or simulation thereof. The arm 106 includes a flexible member 114, indicated schematically here as a spring. While the flexible member 114 deflects by a measureable amount, it need not have less stiffness in the tangential direction than an unmodified arm. Generally, the flexible member 114 is formed in such a way such that its deflections can be more easily measured than in an unmodified arm.

The friction measuring components (e.g., flexible member 114) should allow the arm to 106 to provide structural strength equivalent to an unmodified arm. For example, to retain bending and shear stiffness when acted on by radial forces, a restraint member 116 ensures the arm 106 maintains desired stiffness in the radial direction. The restraint member 116 may also maintain up and down bending stiffness, e.g., around the radial axis and in/out of the plane of the drawing page. It will be appreciated that the flexible member 114 and restraint member 116 may be part of the same component, or may be separate components.

The arm 106 also includes a deflection sensor 118 that provides an output signal in response to deflection of the flexible member 114. Here, the deflection sensor 118 is shown as a variable capacitance sensor, although other sensors may be used, e.g., optical, resistive, strain gauges, etc. Generally, any sensor that can detect relative motion between arm sections 106A and 106B in the tangential may be used to provide a signal indication friction between the slider 104 and media 102. The signals of the deflection sensor 118 are sent to a signal processing module 120, which processes and conditions the signal for use within the apparatus or elsewhere.

The processed signals from module 122 can be used for any purpose, such as drive testing and validation, and/or for use in an in-service drive. Example control/test module 122 is coupled to signal processing module 120 and may provide particular functions based on the friction indicating signals. For example, the control test module 122 may record the signals to test drive performance under some conditions. The control/test module 122 may also provide output signals based on the friction signals. For example, the module 122 may provide feedback signals to other components of the apparatus, such as slider heaters, drive motors, signal processing circuits, etc.

Figure 2:
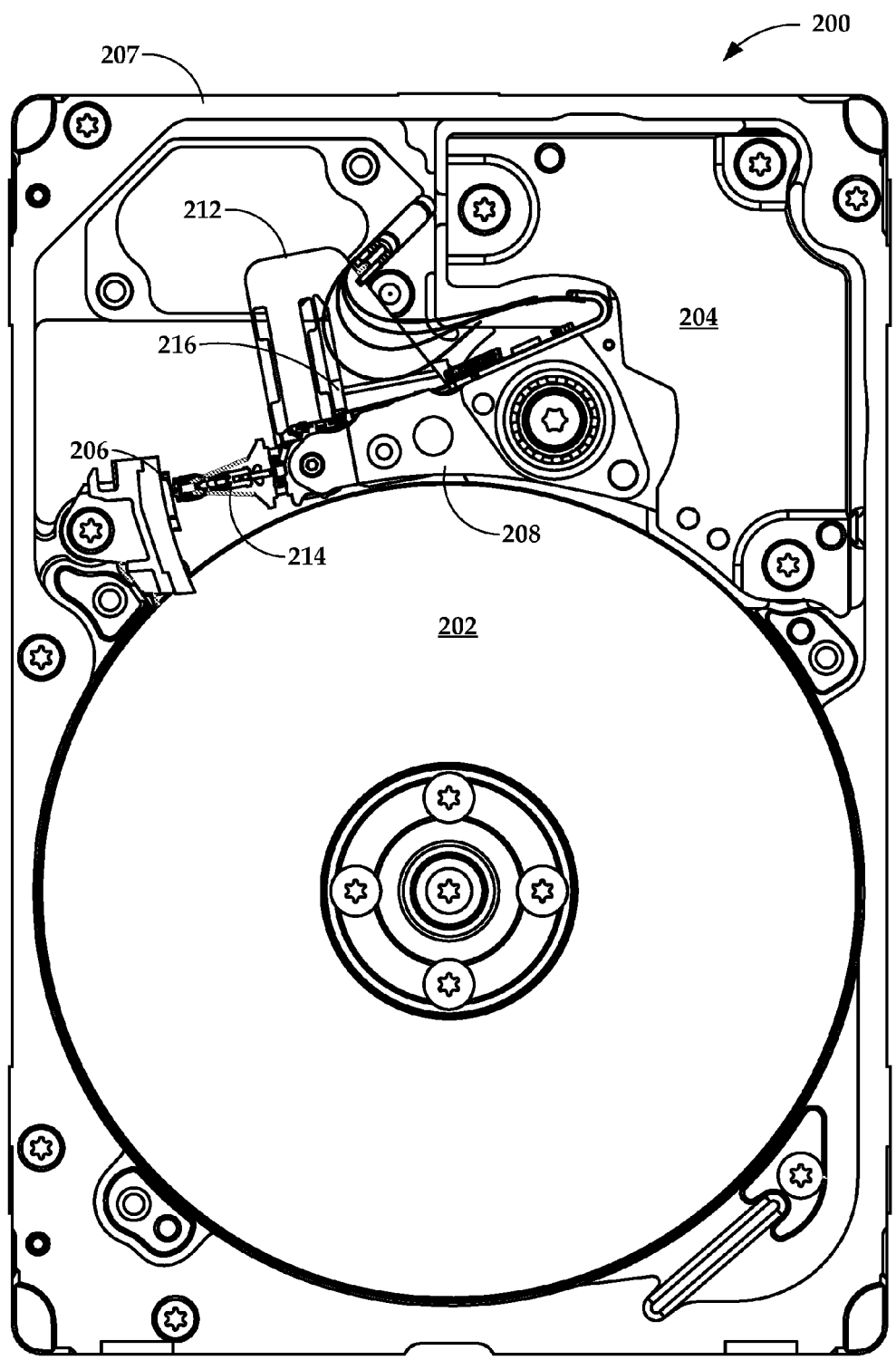
FIG. 2 is a top view of a hard drive with a friction measuring device according to an example embodiment.

In reference now to FIG. 2, a top view of a hard drive 200 shows a friction measuring device according to another example embodiment. The hard drive includes one or more magnetic disks 202, and actuator 204, and slider 206 within production hard drive enclosure 207. The slider 206 is mounted to the end of an arm 208. Arm 208 is connected to the movable part (e.g., voice coil) of actuator 204, and a cantilever assembly 212 is connected to a head-gimbal assembly (HGA) 214. The cantilever 212 provides structural coupling between the arm 208 and the HGA 214, as well as having features that allow tangential deflections of the cantilever 212 to be measured.

A capacitive sensor 216 is mounted to the cantilever assembly 212 and is able to detect deflections of the cantilever assembly 212 to nanometer resolution. These sensed deflections can be used determine frictional forces acting on the slider 206, e.g., by the application of one or more transform functions to voltages or currents output from the capacitive sensor 216. The transform functions may operate on values of the measure capacitance, time rate of change of capacitance (or derivatives thereof), etc. For example, the friction force F may be found using F=kx, where k is a spring constant of the cantilever, and x is displacement, which itself is ultimately of the capacitance measured by sensor 216.

Figure 3:
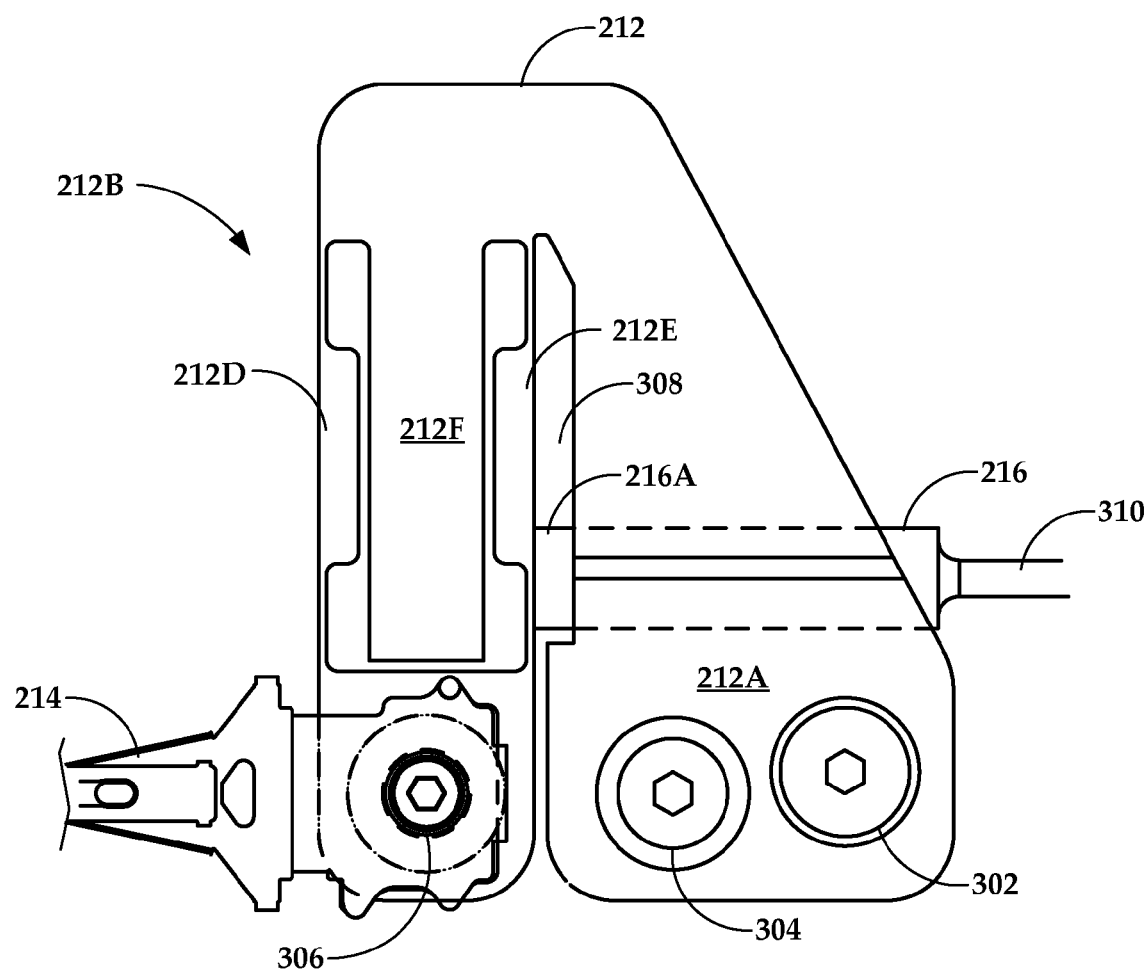
FIG. 3 is a top view of the cantilever assembly according to an example embodiment.

In FIG. 3, a close-up, top view of the cantilever assembly 212 illustrates additional features of the capacitive sensor 216. The capacitive sensor 216 is mounted in a first portion 212A of the cantilever assembly 212 that mounts to the arm (e.g., arm 208 of FIG. 2) by way of fasteners 302, 304. A second portion 212B of the cantilever assembly 212 mounts to the HGA 214 by way of fastener 306. It will be appreciated that the cantilever 212 may be coupled to the arm or HGA 214 using any fastening means, including fasteners, welding, adhesives, etc. The cantilever 212 may also be machined, cast, stamped or otherwise formed together with the arm/HGA as a single piece assembly.

An end 216A of the capacitive sensor 216 spans a gap 308 between the first and second cantilever portions 212A, 212B. The sensor end 216A sits proximate one of two flexure elements 212D, 212E that surround a center beam 212F, all of which are part of the second portion 212B of the cantilever assembly 212. Tangential forces acting on the slider cause a change in geometry in these three members 212D-212F, which is detected by sensor 216. A conductor 310 electrically couples the capacitive sensor 216 to processing circuitry (e.g., module 120 in FIG. 1).

Figure 4:
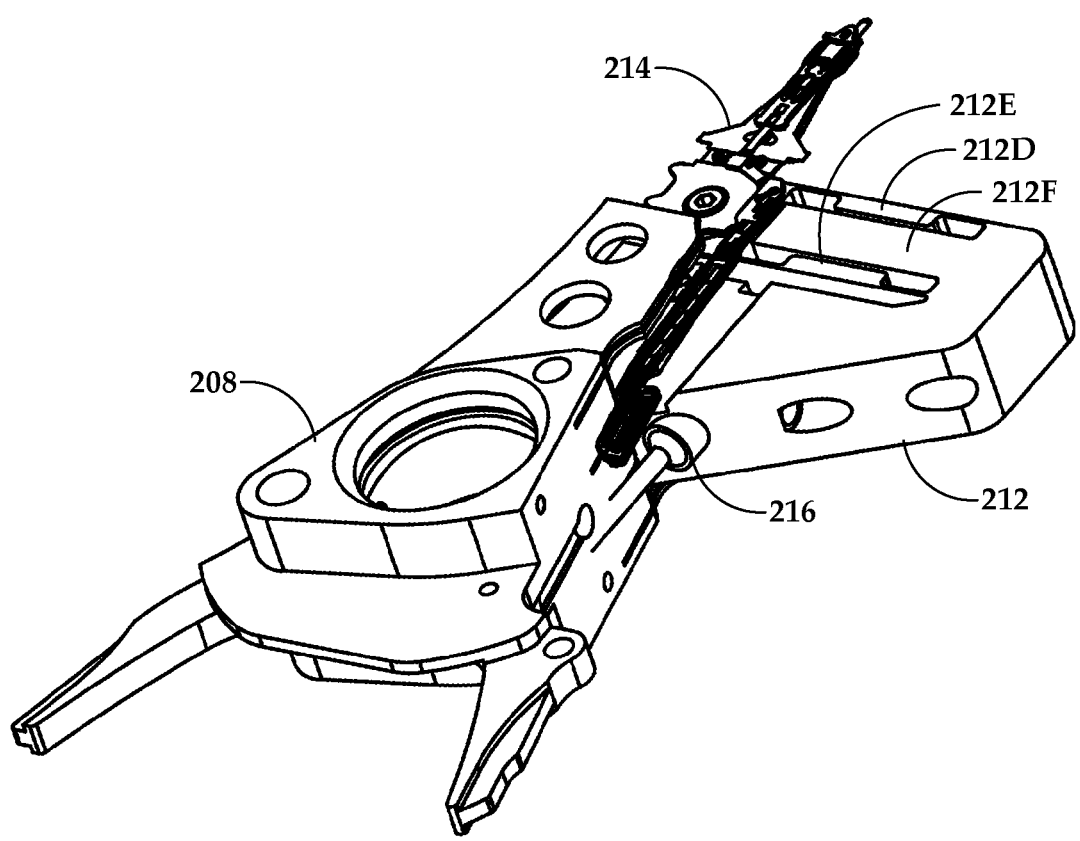
FIG. 4 is a perspective view of an arm and cantilever assembly according to an example embodiment.

In FIG. 4, a perspective view shows the cantilever assembly 212 coupled to the arm 208. As demonstrated in this view, the cantilever assembly 212 has sufficiently large dimensions so that there will be little or no reduction in arm stiffness relative to an unmodified arm, at least in regards to bending and shear in non-tangential directions. The cantilever assembly 212 may also be at least as stiff in the tangential direction as an unmodified arm. The inclusion of flexure/beam 212D-212F and capacitive sensor 216 allows deflection of this assembly to be measured to a high degree of precision.

Figure 5A:
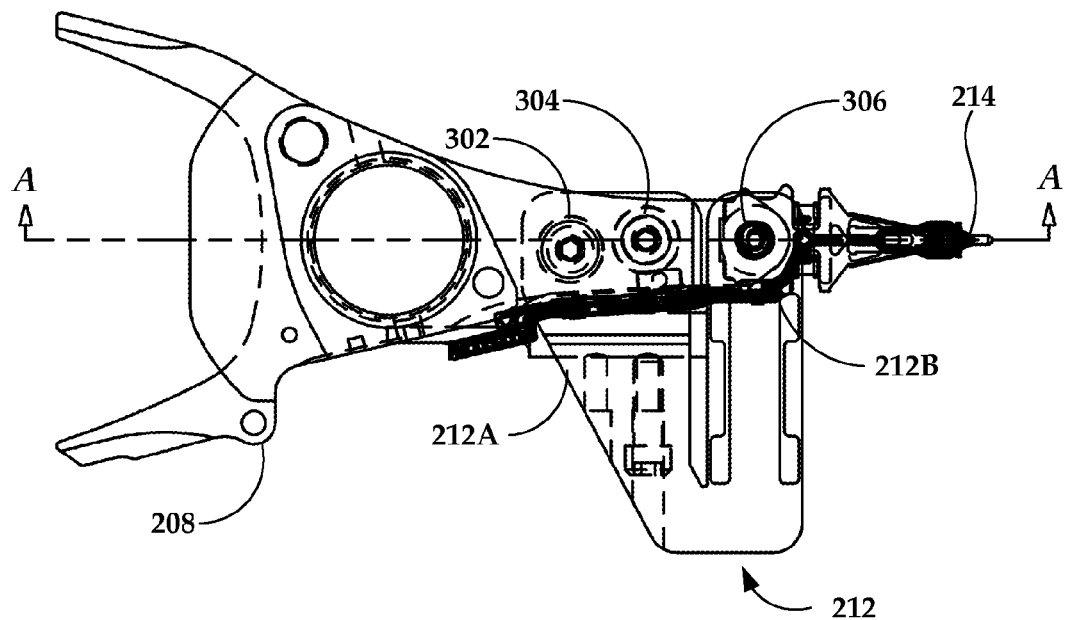
FIG. 5A is a top view of the arm and cantilever assembly shown in FIG. 4.
Figure 5B:
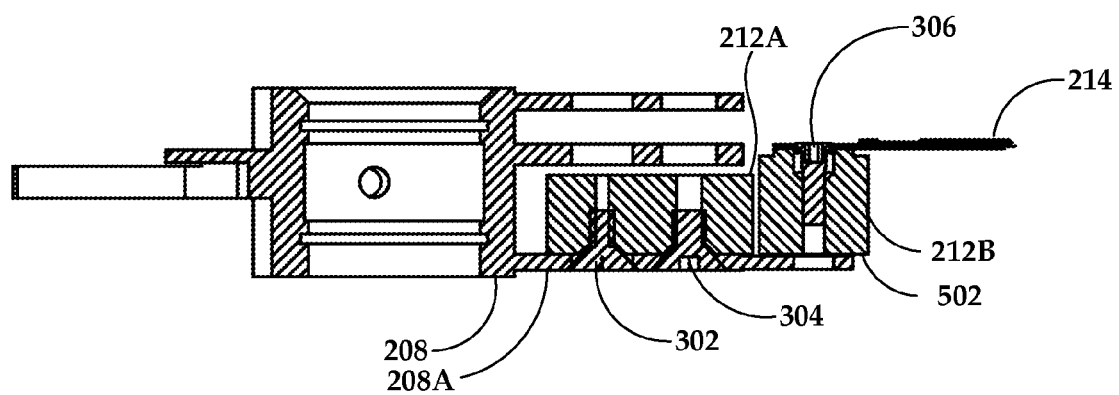
FIG. 5B is a cross-sectional view of the arm and cantilever assembly corresponding to section A-A shown in FIG. 5A.

In reference now to FIGS. 5A and 5B, respective top and side cutaway views of the arm/cantilever assembly illustrate further construction details. The cutaway view in FIG. 5B corresponds to section lines A-A shown in FIG. 5A. As seen in FIG. 5B, a lower extension 208A of arm 208 extends toward first and second portions 212A, 212B of the cantilever assembly 212. Fasteners 302, 304 couple the first portion 212A of the cantilever to the lower extension 208A of the arm 208. The lower extension 208A is also proximate, but not fastened to, a lower surface 502 of the second cantilever portion 212B. This allows for relative motion between cantilever portions 212A, 212B, which still ensuring acceptable stiffness of the arm as a whole.

Figure 6:
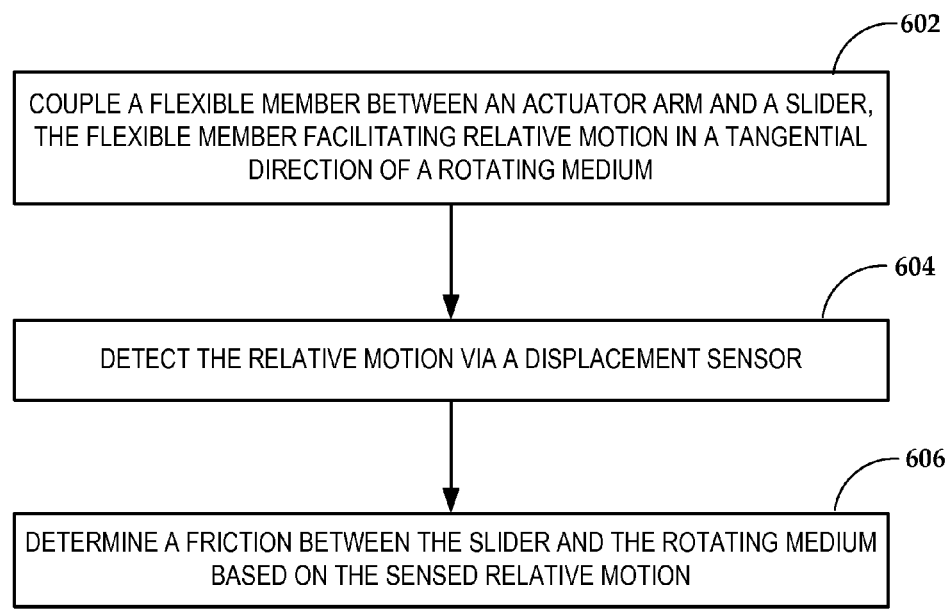
FIG. 6 is a flowchart illustrating a procedure according to an example embodiment.

In reference now to FIG. 6, a flowchart illustrates a procedure according to an example embodiment. The procedure involves coupling 602 a flexible member between an actuator arm and a slider. The flexible member facilitates relative motion in a tangential direction of a rotating medium. The relative motion is detected 604 via a displacement sensor, and a friction is determined 606 between the slider and the rotating medium based on the sensed relative motion.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    coupling a flexible member between an actuator arm and a slider, wherein the flexible member comprises a C-shaped member that deflects along a line between a rotation point of the actuator arm and the slider and facilitates a relative motion in a tangential direction of a rotating medium;
    detecting the relative motion via a capacitive sensor that spans a gap between a first cantilever portion and a second cantilever portion of the flexible member and is disposed proximate a flexure element; and
    determining a friction between the slider and the rotating medium based on the sensed relative motion.

2. The method of claim 1, wherein the flexible member is coupled to a head-gimbal assembly that houses the slider.

3. The method of claim 1, further comprising enclosing the flexible member and sensor in a production hard disk drive enclosure that houses the actuator arm, the slider, and the rotating medium.

4. The method of claim 3, wherein the production hard disk drive enclosure is capable of being sealed with the sensor inside.

5. The method of claim 1, wherein the flexible member is as stiff in the tangential direction as an unmodified arm.

6. A sensor comprising:
    a flexible member coupled between an actuator arm and a head-gimbal assembly that facilitates relative motion therebetween, wherein the head-gimbal assembly houses a slider, and wherein the flexible member comprises a C-shaped member that deflects along a line between a rotation point of the actuator arm and the slider; and
    a capacitive sensor that spans a gap between a first cantilever portion and a second cantilever portion of the flexible member and is disposed proximate a flexure element and delivering a signal indicative of friction between the slider and a rotating medium in response to the relative motion.

7. The sensor of claim 6, wherein the flexible member is coupled to a head-gimbal assembly that houses the slider.

8. The sensor of claim 6, wherein the relative motion is in a tangential direction of the rotating medium.

9. The sensor of claim 6, wherein the sensor is capable of being enclosed in a production enclosure of a hard disk drive that houses the actuator arm, the slider, and the rotating medium.

10. The sensor of claim 9, wherein the production enclosure is capable of being sealed with the displacement sensor inside.

11. The sensor of claim 6, wherein the flexible member is as stiff in a tangential direction as an unmodified arm.

12. A test apparatus, comprising:
    an enclosure configured to enclose components of a production hard disk drive, the enclosure housing:
        a rotating medium;
        a slider;
        an actuator arm;
        a flexible member coupled to the actuator arm and the slider that facilitates relative motion therebetween, the flexible member comprises a C-shaped member that deflects along a line between a rotation point of the actuator arm and the slider; and
        a capacitive sensor coupled to and spanning a gap between a first cantilever portion and a second cantilever portion of the flexible member, disposed proximate a flexure element and delivering a signal indicative of friction between the slider and the rotating medium in response to the relative motion.

13. The test apparatus of claim 12, wherein the flexible member is coupled to a head-gimbal assembly that houses the slider.

14. The test apparatus of claim 12, wherein the relative motion is in a tangential direction of the rotating medium.

15. The test apparatus of claim 12, wherein the enclosure is capable of being sealed for testing of production drive components.

* * * * *